United States Patent
Raither et al.

(10) Patent No.: US 12,060,114 B2
(45) Date of Patent: Aug. 13, 2024

(54) STEERING GEAR FOR A STEER-BY-WIRE STEERING SYSTEM

(71) Applicants: thyssenkrupp Presta AG, Eschen (LI); thyssenkrupp AG, Essen (DE)

(72) Inventors: Wolfram Raither, Sevelen (CH); Philippe Steck, Gamprin-Bendern (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 801 days.

(21) Appl. No.: 17/265,685

(22) PCT Filed: Aug. 9, 2019

(86) PCT No.: PCT/EP2019/071424
§ 371 (c)(1),
(2) Date: Feb. 3, 2021

(87) PCT Pub. No.: WO2020/035409
PCT Pub. Date: Feb. 20, 2020

(65) Prior Publication Data
US 2021/0171090 A1      Jun. 10, 2021

(30) Foreign Application Priority Data
Aug. 16, 2018   (DE) ...................... 10 2018 119 977.5

(51) Int. Cl.
| B62D 5/00 | (2006.01) |
| B62D 5/04 | (2006.01) |
| B62D 6/00 | (2006.01) |

(52) U.S. Cl.
CPC .......... B62D 5/001 (2013.01); B62D 5/0424 (2013.01); B62D 5/0445 (2013.01); B62D 5/0448 (2013.01); B62D 6/001 (2013.01)

(58) Field of Classification Search
CPC .... B62D 5/001; B62D 5/0424; B62D 5/0445; B62D 5/0448; B62D 6/001
See application file for complete search history.

(56) References Cited

U.S. PATENT DOCUMENTS

| 3,508,633 A | 4/1970 | Yoshihiro |
| 3,699,624 A | 10/1972 | De Gain |

(Continued)

FOREIGN PATENT DOCUMENTS

| CN | 2278793 Y | 4/1998 |
| CN | 101332830 A | 12/2008 |

(Continued)

OTHER PUBLICATIONS

English Translation of International Search Report issued in PCT/EP2019/071424, dated Oct. 18, 2019.

(Continued)

*Primary Examiner* — Jacob D Knutson
(74) *Attorney, Agent, or Firm* — hyssenkrupp North America, LLC

(57) ABSTRACT

A steering gear for a steer-by-wire steering system of a motor vehicle may include an electric motor having a motor shaft. The motor shaft drives a spindle of a worm gear, and the worm gear comprises a spindle nut in such a manner that a rotational movement originating from the motor shaft is converted into a linear movement of the spindle nut along an axis. The spindle nut, for purposes of steering wheels of the motor vehicle, is connected to at least one tie rod. The worm gear may be a ball screw drive, a trapezoidal drive, or a roller screw drive.

14 Claims, 2 Drawing Sheets

(56) References Cited

U.S. PATENT DOCUMENTS

| | | | |
|---|---|---|---|
| 4,050,326 A | 9/1977 | Kopf | |
| 4,653,602 A * | 3/1987 | Anders | B62D 5/0427 180/444 |
| 4,742,882 A * | 5/1988 | Shimizu | B62D 5/0448 180/444 |
| 5,461,767 A | 10/1995 | Okubo | |
| 5,503,431 A | 4/1996 | Yamamoto | |
| 5,595,089 A * | 1/1997 | Watanabe | B62D 5/0445 180/315 |
| 5,975,234 A | 11/1999 | Bugosh et al. | |
| 2002/0198057 A1 | 12/2002 | Stervik | |
| 2003/0047374 A1 * | 3/2003 | Peppler | B62D 5/0421 180/443 |
| 2003/0051938 A1 | 3/2003 | Menjak et al. | |
| 2007/0089926 A1 | 4/2007 | Jo | |
| 2008/0011537 A1 * | 1/2008 | Ozsoylu | B62D 5/0442 701/41 |
| 2009/0001701 A1 | 1/2009 | Watanabe et al. | |
| 2011/0247891 A1 | 10/2011 | Meyer | |
| 2012/0024616 A1 | 2/2012 | Birkwald et al. | |
| 2017/0248247 A1 | 8/2017 | Lenz | |
| 2018/0319422 A1 | 11/2018 | Polmans et al. | |
| 2019/0061812 A1 | 2/2019 | Hecker | |
| 2019/0152521 A1 | 5/2019 | Urbach | |
| 2019/0315391 A1 | 10/2019 | Illés et al. | |

FOREIGN PATENT DOCUMENTS

| | | | |
|---|---|---|---|
| CN | 207345912 U | 5/2018 | |
| CN | 207565676 U | 7/2018 | |
| DE | 800480 C | 11/1950 | |
| DE | 2459246 A | 6/1976 | |
| DE | 10114308 A | 8/2001 | |
| DE | 10157797 A1 | 9/2002 | |
| DE | 10200097 A1 | 7/2003 | |
| DE | 10331597 A1 | 2/2005 | |
| DE | 102005051981 A | 11/2006 | |
| DE | 102006008911 A | 8/2007 | |
| DE | 102009024847 A | 12/2010 | |
| DE | 10 2012 015 181 A | 5/2014 | |
| DE | 102012015181 A1 | 5/2014 | |
| DE | 10 2013 000 892 A1 | 7/2014 | |
| DE | 102015118292 A1 | 4/2017 | |
| DE | 10 2015 015 148 A1 | 6/2017 | |
| DE | 102016212812 A1 | 1/2018 | |
| EP | 0661117 A | 7/1995 | |
| EP | 1911660 A | 4/2008 | |
| GB | 1262913 A | 2/1972 | |
| JP | S62-137269 A | 6/1987 | |
| JP | H05270415 A | 10/1993 | |
| JP | 2003118597 A | 4/2003 | |
| WO | WO-2011047921 A1 * | 4/2011 | B21D 15/10 |
| WO | 2014019694 A1 | 2/2014 | |
| WO | 2017184815 A1 | 10/2017 | |

OTHER PUBLICATIONS

"Merkmale der Kugelgewindetriebe" THK. Retrieved from the Internet: https://tech.thk.com/de/products/pdf/de_b_1_0_5_006.pdf [retrieved on Dec. 18, 2019] XP002796566 [English translation not available].

* cited by examiner

STEERING GEAR FOR A STEER-BY-WIRE STEERING SYSTEM

CROSS REFERENCE TO RELATED APPLICATIONS

This application is a U.S. National Stage Entry of International Patent Application Serial Number PCT/EP2019/071424, filed Aug. 9, 2019, which claims priority to German Patent Application No. DE 10 2018 119 977.5, filed Aug. 16, 2018, the entire contents of both of which are incorporated herein by reference.

FIELD

The present disclosure generally relates to steer-by-wire steering systems of motor vehicles and to steering gears for steer-by-wire steering systems.

BACKGROUND

In steer-by-wire steering systems, the position of the steered wheels is not directly coupled to the steering input means, for example, a steering wheel. There is a connection between the steering wheel and the steered wheels via electrical signals. The steering action desired by the driver is detected by a steering angle sensor and, depending on the steering action desired by the driver, the position of the steered wheels is controlled via a steering actuator. It is known to provide two steering actuators which are each associated with one of the steerable wheels and which are configured to adjust a steering angle of the respective wheel. There may also be provided a toothed rack steering gear which is in engagement with a pinion which is driven by a steering actuator.

In electromechanical steering gears, it is known to use axially parallel ball screw drives for converting an engine torque of an auxiliary drive into a linear movement of the toothed rack. The connection of the toothed rack to the steering pinion permits axial movements of the toothed rack, whilst rotations of the toothed rack are prevented. The ball screw drive is consequently constructed with a driven and rotatably supported ball nut. From the patent application DE 10 2012 015 181 A1 an electromechanical motor vehicle steering system is known and has parallel with the toothed rack an auxiliary drive with a spindle and a ball nut which is arranged thereon. The toothed rack and the spindle are connected to each other at the ends thereof by means of an end plate so that a displacement with respect to each other in an axial direction is not possible. A connection to the tie rods can be produced in the region of the ends.

Such ball screw drives (or roller screw drives or trapezoidal screw drives) absorb not only axial forces, but also radial forces and tilting moments which are introduced via the tie rods. There is thereby produced an unfavorable loading of the screw drive and consequently significantly greater dimensions than with a mainly axial loading. In spite of structural measures to reduce the sensitivity with respect to tilting (for example, by means of flexible connection of the ball screw drive using wave springs), the friction behavior of the steering gear worsens significantly as a result of these load components.

Thus a need exists for a steering gear for a steer-by-wire steering system of a motor vehicle which has a small structural space requirement and which enables a better friction behavior of the steering gear.

DETAILED DESCRIPTION

Figure 1:
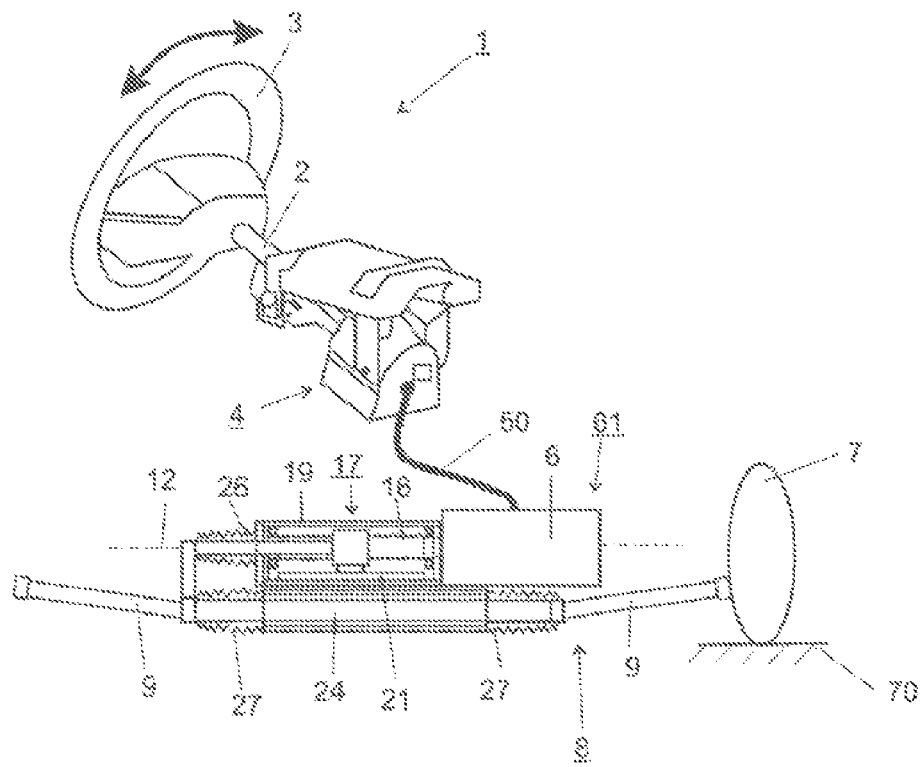
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a steering gear for a steer-by-wire steering system of a motor vehicle having an electric motor having a motor shaft is provided, wherein the motor shaft drives a spindle of a worm gear and the worm gear comprises a spindle nut in such a manner that a rotational movement originating from the motor shaft is converted into a linear movement of the spindle nut along an axis, wherein the spindle nut in order to steer wheels of the motor vehicle is connected to at least one tie rod. In contrast to electromechanical steering systems, the connection of the steering pinion is omitted in steer-by-wire systems. The driving is carried out according to the invention via a rotatably supported spindle, whereby structural space is saved. Preferably, the worm gear is a ball screw drive, a trapezoidal screw drive or a roller screw drive. There is preferably provision for the worm gear to be arranged in a housing in which the spindle is rotatably supported and the spindle nut is supported with an axial guide.

It is conceivable and possible for a rotary angle sensor to be provided on the spindle or the motor shaft so that as a result of the rotation of the motor shaft or the spindle a rotation angle can be measured.

It is further conceivable and possible for there to be provided a linear position sensor which is arranged on the spindle nut or on another axially movable component of the steering gear and which detects the movement thereof.

The direct connection of the spindle nut is preferably carried out to a single tie rod, in particular via a lever which is rigid in an axial direction, so that the linear movement of the spindle nut is transmitted to this tie rod.

Preferably, the lever is configured in such a manner that the axis of the linear movement extends parallel with the movement direction of the tie rod (or the articulation location of the tie rod). The lever is preferably linear and does not have an angle.

It is preferable for the lever to be connected to an inner thread of the tie rod. Furthermore, the lever may be connected to the tie rod by means of an articulation and may move it in an axial direction. The articulation is preferably an internal articulation.

Furthermore, a steer-by-wire steering system for a motor vehicle is provided, comprising:
- an electronically controllable steering actuator which acts on the steered wheels,
- a control unit,
- a feedback actuator which can be acted on by a driver with a driver's desired steering angle via a steering input means and which transmits a feedback signal to the steering input means as a response to the driver request and a travel state of the motor vehicle,
- a device for signal transmission, which transmits the driver's request to the control unit,
- wherein the control unit controls the steering actuator in order to transform the driver's request into a redirection of the steered wheels, and wherein a steering gear which comprises the steering actuator is configured as claimed in one of the preceding embodiments.

In an advantageous embodiment of the steering system, the movement of the tie rod which is directly connected to the spindle nut is transmitted to a second tie rod of the steering system by means of a coupling rod which extends parallel with the movement direction of the spindle nut.

Preferably, the electric motor is arranged in the region of the coupling rod. The spindle drive and the electric motor having the control unit are preferably orientated parallel with the coupling rod, which is enabled by the lever. This is a particularly space-saving embodiment. The electric motor has a motor shaft which is connected in a rotationally secure manner to a threaded spindle of the worm gear. The connection can preferably be carried out directly or by means of a coupling. It is preferably constructed in an aligned manner. There may also be provision for the motor to drive the threaded spindle via a step-down gear transmission.

It is advantageous for the worm gear or for the housing of the worm gear to be sealed toward the exterior by means of a bellows.

Preferably, the coupling rod is arranged in a housing which is sealed toward the exterior by means of at least one bellows.

Figure 2:
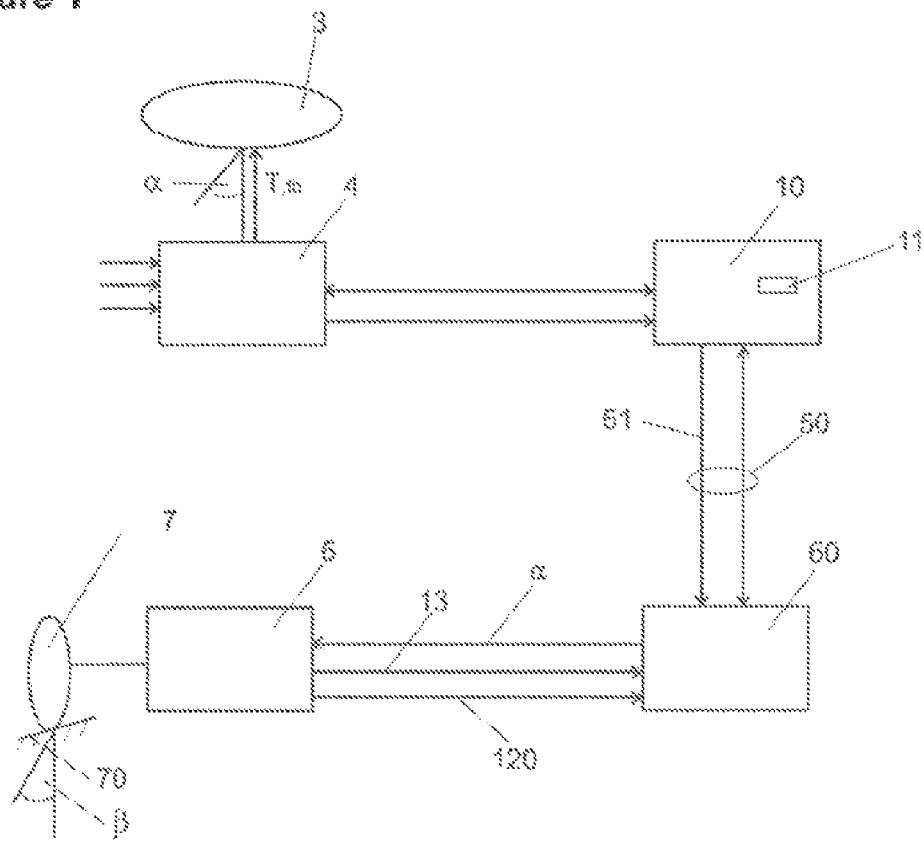
FIG. 2 is a block diagram of a control of an example steer-by-wire steering system.

FIG. 1 shows a steer-by-wire steering system 1. There is fitted to a steering shaft 2 a rotary angle sensor which is not illustrated and which detects the driver steering angle which is applied by turning a steering input means 3 which is constructed in the example as a steering wheel. However, a steering torque can also be detected in addition. A joystick may be used as the steering input means. There is further fitted to the steering shaft 2 a feedback actuator 4 which serves to simulate the reactions from the road 70 to the steering wheel 3 and consequently to provide the driver with feedback relating to the steering and travel behavior of the vehicle. The driver's steering request is transmitted via the rotation angle α of the steering shaft 2 measured by the rotary angle sensor via signal lines to a feedback actuator monitor unit 10, as illustrated in FIG. 2. The feedback actuator monitor unit 10 transmits the driver's steering request to the control unit 60. The feedback actuator monitor unit 10 preferably also takes over the control of the feedback actuator 4. The feedback actuator monitor unit 10 may also be constructed integrally with the control unit 60. The control unit 60 controls in accordance with the signal of the rotary angle sensor and other input variables an electrical steering actuator 6 which controls the position of the steered wheels 7. The steering actuator 6 acts via a steering rod steering gear 8, such as, for example, a toothed rack steering gear, and via tie rods 9 and other components directly on the steered wheels 7. The detailed description of the steering gear 61 according to the invention is set out under FIG. 3.

FIG. 2 shows a control system of a steering actuator 6. The steering actuator 6 receives the steering angle α from the control unit 60. The toothed rack position 120 measured on a toothed rack 12 and other road information items 13 are transmitted to the control unit 60. The control unit 60 determines the toothed rack force by means of known measurement or estimation methods and calculates from this a steering torque $T_{fb}$. The feedback actuator 4 is controlled accordingly, whereby a steering sensation is produced. The control unit 60 further receives driver steering commands 51, such as the steering angle status. The feedback actuator 4 receives signals via the signal line 50 inter alia from the rotary angle sensor which measures and stores the steering angle α, the steering angle acceleration and the steering angle speed. The feedback actuator 4 communicates with a feedback actuator monitor unit 10 which controls the feedback actuator 4. The feedback actuator monitor unit 10 receives from the control unit 60 of the steering actuator 6 the actual steering angle β of the steered wheels 7, and other variables which the control unit 60 has established.

Figure 3:
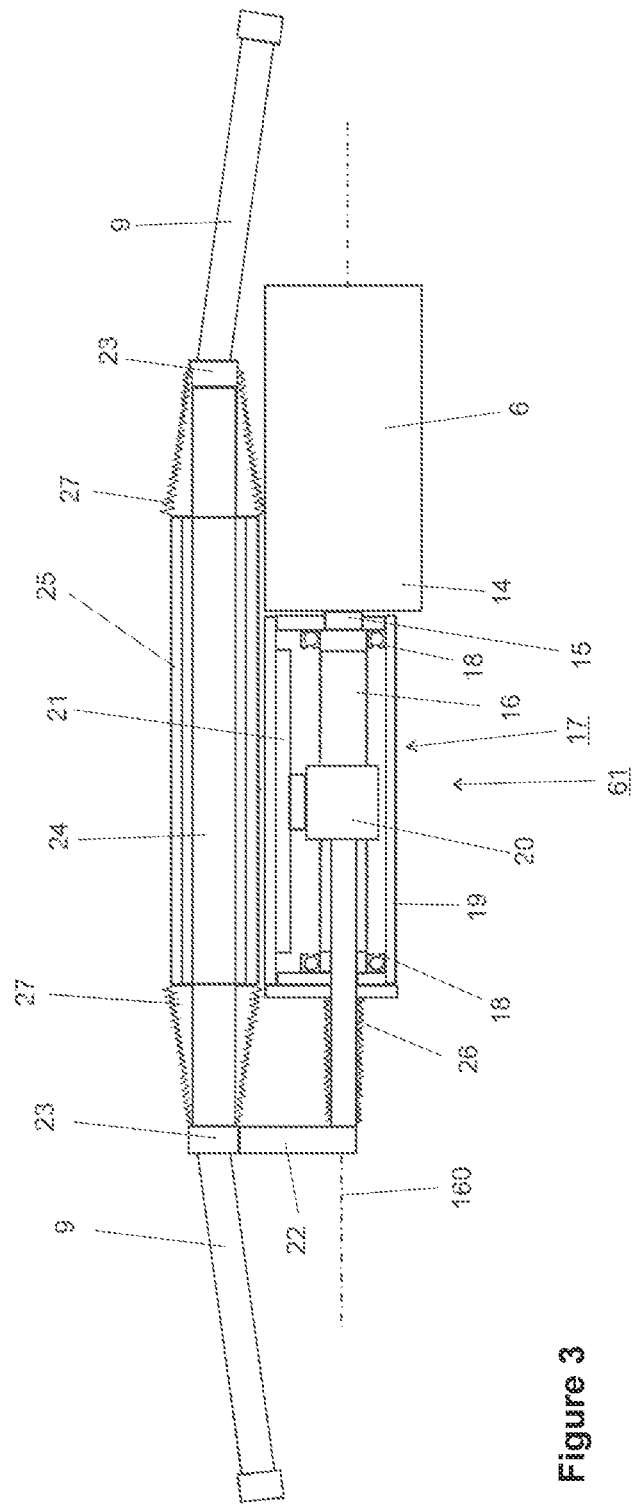
FIG. 3 is a schematic view of an example steering gear.

FIG. 3 shows the steering gear 61 according to the invention. An electric motor 14 having a control unit (power pack) has a motor shaft 15 which is connected in a rotationally secure manner to a threaded spindle 16 (drive spindle) of a ball screw drive 17. The connection can be carried out directly or via a coupling. It is preferably constructed in an aligned manner. There may also be provision for the motor to drive the threaded spindle via a step-down gear transmission. The threaded spindle 16 is rotatably supported about a longitudinal axis 160 at the two ends thereof in ball bearings 18, in particular spindle bearings, in a housing 19. There is preferably provision for the ball bearings 18 to be constructed at one side as a fixed bearing and at the other side as a movable bearing. The ball screw drive 17 has a ball nut 20 which is located on the threaded spindle 16 and which concentrically surrounds it. The ball nut 20 is retained at the outer side thereof in a linear guide 21. The linear guide 21 is secured to the inner side of the housing 19 or constructed integrally with the housing 19. The linear guide 21 determines a translational movement of the ball nut 20 along the longitudinal axis 160. As a result of this support, there is produced a conversion of a rotational movement of the threaded spindle 16 into a linear movement of the ball nut 20 along the longitudinal axis 160. The linear guide 21 may absorb radial and/or tilting loads. The ball nut 20 is connected to the tie rods 9 directly or by means of additional components. As a result of movement of the ball nut 20 along the longitudinal axis 160, a steering movement is consequently produced. A non-central arrangement of the actuator 6 with respect to the wheels can be compensated for by the geometry of the connection elements.

In the embodiment shown in FIG. 3, the nut 20 of the spindle drive 17 is connected via a lever 22 to an articulation 23 of a first tie rod 9 and moves it in an axial direction. The articulation 23 is preferably an internal articulation which is arranged at the end of the tie rod 9 remote from the wheel. The movement of this tie rod is transmitted via a coupling rod 24 by means of which the inner articulations 23 of both tie rods 9 are connected, to the other side, to the second tie rod 9. The coupling rod 24 is guided in a linear manner in a simple second housing 25 and absorbs the radial portions of the tie rod forces. The spindle drive 17 and the electric motor 14 or the power pack are located in the region of the coupling rod 24 and are orientated parallel therewith. The lever 22 is constructed in such a manner that the spindle drive 17 and the power pack are located in the direct vicinity of the coupling rod 24, which makes the arrangement particularly compact. The lever 22 is preferably rigid in the longitudinal direction. In the simplest embodiment thereof, it is linear and does not have an angle. The lever 22 is preferably configured in such a manner that it connects the coupling rods 24 which are parallel with each other and the threaded spindle 16 over the shortest spacing. The spindle drive 17 or the housing 19 can be sealed externally with a bellows 26 which is, for example, secured to the motor housing. There is illustrated a seal with a bellows 26 which extends from the housing 19 in the direction toward the lever 22. The housing 25 in which the coupling rod 24 is arranged is also preferably sealed externally at both ends with a bellows 27. The two bellows 27 extend in this instance from the housing 25 toward the inner thread 23 of the corresponding tie rod 9.

Since radial and tilting loads are absorbed by the linear guide 21, the ball screw drive 17 is loaded almost exclusively axially and may be constructed to be significantly smaller, lighter and more cost-effective than in conventional constructions. With the same load-bearing capacity, there is produced a substantially improved friction behavior. The spindle length corresponds to the travel of the transmission 17, plus additions for thread run-out and bearing. The bearing of the nut 20 is omitted, which affords an advantage with respect to structural space requirement in the radial direction which in many cases is significantly limited. As a result of the more favorable sizing of the ball screw drive 17, the transmission ratio of upstream transmission stages (such as, for example, a belt drive) can be reduced, or it can even be dispensed with completely, which affords advantages with regard to costs and—decisively for the steer-by-wire system—provides operational reliability. Another advantage involves the lower rotational imbalance compared with solutions in which the nut rotates.

The invention is not limited to ball screw drives; worm gears, that is to say, roller screw drives or trapezoidal screw drives, can also generally be used.

What is claimed is:

1. A steering gear for a steer-by-wire steering system of a motor vehicle, comprising an electric motor having a motor shaft that drives a spindle of a worm gear, wherein the worm gear comprises a spindle nut configured such that rotational movement originating from the motor shaft is converted to linear movement of the spindle nut along an axis, wherein the spindle nut is connected to a tie rod for steered wheels of the motor vehicle, wherein the spindle nut is directly connected to the tie rod via a lever that is rigid in an axial direction such that the linear movement of the spindle nut is transmitted to the tie rod, and wherein the tie rod is the only tie rod to which the spindle nut is directly connected.

2. The steering gear of claim 1 wherein the worm gear is a ball screw drive.

3. The steering gear of claim 1 wherein the worm gear is a trapezoidal drive.

4. The steering gear of claim 1 wherein the worm gear is a roller screw drive.

5. The steering gear of claim 1 wherein the worm gear is disposed in a housing in which the spindle is rotatably supported, wherein the spindle nut is supported with an axial guide.

6. The steering gear of claim 1 wherein the lever is configured such that the axis of the linear movement extends parallel to a movement direction of the tie rod.

7. The steering gear of claim 1 wherein the lever is connected to an inner thread of the tie rod.

8. A steer-by-wire steering system for a motor vehicle, the steer-by-wire steering system comprising:
   a steering gear comprising an electric motor having a motor shaft that drives a spindle of a worm gear, wherein the worm gear comprises a spindle nut configured such that rotational movement originating from the motor shaft is converted to linear movement of the spindle nut along an axis, wherein the spindle nut is connected to a tie rod for steered wheels of the motor vehicle, wherein the spindle nut is directly connected to the tie rod via a lever that is rigid in an axial direction such that the linear movement of the spindle nut is transmitted to the tie rod, and wherein the tie rod is the only tie rod to which the spindle nut is directly connected, the steering gear comprising an electronically controllable steering actuator configured to act on the steered wheels of the motor vehicle;
   a control unit;
   a feedback actuator configured to be acted upon by a driver with a driver-desired steering angle via a steering input means, wherein the feedback actuator is configured to transmit a feedback signal to the steering input means in response to the driver-desired steering angle and a travel state of the motor vehicle; and
   a signal transmission device configured to transmit the driver-desired steering angle to the control unit,
   wherein the control unit controls the electronically controllable steering actuator to transform the driver-desired steering angle into a redirection of the steered wheels.

9. The steer-by-wire steering system of claim 8 wherein the worm gear is a ball screw drive.

10. The steer-by-wire steering system of claim 8 wherein the worm gear is a trapezoidal drive.

11. The steer-by-wire steering system of claim 8 wherein the worm gear is a roller screw drive.

12. The steer-by-wire steering system of claim 8 wherein the worm gear is disposed in a housing in which the spindle is rotatably supported, wherein the spindle nut is supported with an axial guide.

13. The steer-by-wire steering system of claim 8 wherein the lever is configured such that the axis of the linear movement extends parallel to a movement direction of the tie rod.

14. The steer-by-wire steering system of claim 8 wherein the lever is connected to an inner thread of the tie rod.

* * * * *